(12) United States Patent
Cantonwine et al.

(10) Patent No.: US 8,208,597 B2
(45) Date of Patent: Jun. 26, 2012

(54) CHANNEL CONFINEMENT SYSTEM AND METHOD FOR DRY-STORAGE OF BWR FUEL BUNDLES

(75) Inventors: Paul Everett Cantonwine, Wilmington, NC (US); Andrew K. Langston, Wilmington, NC (US); Charles B. Patterson, Jr., Wilmington, NC (US); Johnny R. Skipper, Leland, NC (US); Alexander Michael Hay, Endicott, NY (US); Carlton Wayne Clark, Wilmington, NC (US); David Grey Smith, Leland, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 851 days.

(21) Appl. No.: 12/183,667

(22) Filed: Jul. 31, 2008

(65) Prior Publication Data

US 2010/0027733 A1 Feb. 4, 2010

(51) Int. Cl.
*G21C 19/00* (2006.01)
*G21C 15/00* (2006.01)
*G21C 9/00* (2006.01)
*G21F 5/00* (2006.01)
*B01D 29/00* (2006.01)

(52) U.S. Cl. ........ 376/272; 376/302; 376/362; 376/364; 250/506.1; 250/507.1; 210/237

(58) Field of Classification Search .................. 376/272, 376/302, 362, 364; 250/506.1, 507.1
See application file for complete search history.

(56) References Cited

U.S. PATENT DOCUMENTS

| 4,781,883 | A | 11/1988 | Daugherty et al. |
| 5,028,382 | A | 7/1991 | King, Jr. et al. |
| 5,390,221 | A | 2/1995 | Dix et al. |
| 5,524,031 | A | 6/1996 | Kilian |
| 5,550,882 | A | 8/1996 | Lehnert et al. |
| 5,748,694 | A | 5/1998 | King |
| 6,690,758 | B1 | 2/2004 | Elkins |
| 2006/0018422 | A1 | 1/2006 | Mayer |

FOREIGN PATENT DOCUMENTS

| EP | 0 710961 A1 | 5/1996 |
| EP | 0 690453 B1 | 9/1998 |
| GB | 924213 | 4/1963 |

*Primary Examiner* — Rick Palabrica
*Assistant Examiner* — Erin M Leach
(74) *Attorney, Agent, or Firm* — Nixon & Vanderhye P.C.

(57) ABSTRACT

A nuclear reactor fuel bundle confinement system including: a fuel bundle with an upper tie plate; a channel enclosing the fuel bundle; a handle for the fuel bundle extending above the fuel bundle; an upper fuel particle barrier positioned over the upper tie plate and above the fuel rods, wherein the fuel particle barrier has a permeable panel at least co-extensive with an open area of the upper tie plate; a slot in the permeable panel through which passes the handle, and a closure device on the fuel particle barrier having a closed position which covers the slot and an open position that leaves the slot open; a lower fuel particle barrier positioned over the lower tie plate and below the fuel rods, wherein the lower portion of the fuel bundle assembly is grasped by the lower fuel particle barrier.

27 Claims, 9 Drawing Sheets

CHANNEL CONFINEMENT SYSTEM AND METHOD FOR DRY-STORAGE OF BWR FUEL BUNDLES

BACKGROUND OF THE INVENTION

The present invention relates to nuclear fuel bundle assemblies and, particularly, to dry-storage of fuel bundle assemblies.

The core of a boiling water nuclear reactor (BWR) includes a plurality of fuel bundle assemblies arranged side-by-side. When removed from the core of a BWR, the fuel bundle assemblies are temporarily stored in a water-filled spent fuel pool. After years of storage in the spent fuel pool, the fuel bundle assemblies are transferred to a dry storage containment vessel, e.g., a canister. Typical dry storage canisters hold approximately sixty (60) BWR fuel bundle assemblies and are backfilled with helium to provide a convective heat transfer medium to remove heat from the assemblies to the canister.

The loading configurations in dry storage canisters are controlled to ensure decay-heat-load and criticality limits are met. Decay heat loads are controlled to limit internal temperatures that could damage sound, i.e., undamaged, fuel bundles or degrade damaged fuel bundles. Decay heat can be transferred from the fuel bundle assemblies to the dry storage canister via conduction, convection and radiation. Criticality calculations are performed to ensure a criticality cannot occur in a hypothetical reloading accident. In these criticality calculations sound fuel bundles are assumed to remain sound while damaged fuel bundles are assumed to fail completely.

The determination of whether a fuel bundle is sound or damaged is made prior to loading the dry storage containment vessel or canister. A fuel bundle is considered damaged if the cladding on the fuel rods has been breached such that fuel particles could be released. Fuel particles are highly radioactive and if released in large scale, the criticality assumptions would be modified.

Therefore, damaged fuel bundles are not placed directly in dry storage like sound fuel bundles. The damage to cladding on fuel rods may allow fuel particles to fall into the fuel bundle assembly and into the dry storage containment vessel, unless the released fuel particles are confined to the damaged fuel bundle assembly. The minimum particle size required to be confined is approximately 1 mm (millimeter). Because of the potential for fuel particle release, damaged fuel bundles are conventionally placed within a damaged fuel storage canister prior to being placed within the dry storage containment vessel.

A conventional storage approach is to remove the channel from each damaged fuel bundle assembly and place the remaining fuel bundle within a damaged fuel storage canister. The canister slides over the length of the fuel bundle and is capped at each end. The caps on the canister prevent fuel particles from flowing out of the ends of the canister and into the dry storage containment vessel. The caps are vented to allow the fluid pressures within the canister and around the fuel bundle to equalize with the pressure in the containment vessel but are not designed to promote gas flow that enhances convective heat transfer.

The damaged fuel storage canister is placed in the dry storage containment vessel with sound fuel bundle assemblies and other canisters having damaged fuel bundles. The number of damaged fuel storage canisters in a dry storage containment vessel is limited based on either the heat load or criticality requirements. After being removed from the damaged fuel bundle assembly, the channel is discarded in an alternate waste stream.

This typical approach to storing damaged fuel bundle assemblies has at least three disadvantages: (1) the damage fuel bundle assembly must be partially disassembled by removing the channel; this results in fuel moves without the protection of the channel and considerations of hypothetical bundle drop accidents in the fuel pool, (2) The added costs for a damaged fuel storage canister and to discard the channel in an alternate waste stream, and (3) convection in the damage fuel canister is not considered in the heat load determinations.

BRIEF DESCRIPTION OF THE INVENTION

A fuel particle confinement system for a nuclear reactor fuel bundle has been developed including: a fuel bundle including an array of fuel rods and an upper tie plate; a channel enclosing the fuel bundle and having an open upper end; a handle for the fuel bundle extending above the fuel bundle; an upper fuel particle barrier positioned over the upper tie plate and above the fuel rods, wherein the fuel particle barrier has a permeable panel at least co-extensive with an open area of the upper tie plate; a slot in the permeable panel through which passes the handle, and a closure device on the fuel particle barrier having a closed position in which the door covers the slot and an open position that leaves the slot open to allow the handle passes through the slot.

A fuel particle confinement system for a nuclear reactor fuel bundle has been developed comprising: a fuel bundle including an array of fuel rods, a lower tie plate and a lower tie plate tri-bail attached to and below the lower tie plate; a channel enclosing the fuel bundle and having an open lower end; a lower fuel particle barrier including sidewalls with an array of finger springs that are adjacent to the outer walls of the channel, a bottom panel and an open upper end to receive a lower portion of the fuel bundle assembly, wherein at least one of the sidewalls includes a permeable panel; the lower fuel particle barrier further including a frame within and supporting the sidewalls and bottom panel, and the frame includes a ring defining an opening to receive the bottom of the tri-bail, and at least one clip attached to the frame, wherein the clip grasps the lower portion of the fuel bundle assembly.

A fuel particle confinement system for a nuclear reactor fuel bundle has been developed comprising: a fuel bundle including an array of fuel rods, an upper tie plate, a lower tie plate and a lower tie plate tri-bail attached to and below the lower tie plate; a channel enclosing the fuel bundle and having an open lower end; an upper fuel particle barrier positioned over the upper tie plate and above the fuel rods, wherein the fuel particle barrier has a permeable panel at least co-extensive with an open area of the upper tie plate; a slot in the permeable panel through which passes the handle; a closure device on the fuel particle barrier having a closed position in which the door covers the slot and an open position that leaves the slot open to allow the handle passes through the slot; a lower fuel particle barrier including sidewalls adjacent outer walls of the channel, a bottom panel and an open upper end to receive a lower portion of the fuel bundle assembly, wherein at least one of the sidewalls includes a permeable panel and an array of finger springs in the sidewalls.

The lower fuel particle barrier may further include a frame within and supporting the sidewalls and bottom panel, and the frame includes a ring defining an opening to receive the bottom of the tri-bail, and at least one clip attached to the frame, wherein the clip grasps the lower portion of the fuel bundle assembly. Further, the lower fuel particle barrier may include a corner supporting structure that contains a receiver within each structure support of the short columns; whereas, the receiver allows the lower fuel particle barrier assembly to be firmly secured by a special retaining device that maybe attached to a fuel inspection station at a nuclear facility; the receiver may also make use of special handling devices for engaging the receiver to aid in the removal and insertion of the fuel bundle assembly from the lower fuel particle barrier assembly.

A method has been developed to confine a nuclear reactor fuel bundle assembly including a fuel bundle including an array of fuel rods, an upper tie plate, a handle above the upper tie plate, a lower tie plate and a lower tie plate tri-bail attached to and below the lower tie plate, and a channel enclosing the fuel bundle, the method comprising: inserting a lower portion of the fuel bundle assembly into an open upper end of a fuel particle barrier having sidewalls with an array of finger springs adjacent to the outer walls of the channel and a bottom panel, wherein at least one of the sidewalls and bottom panel have a permeable panel; supporting the lower portion of the fuel bundle on a surface of an interface in the lower fuel particle barrier; grasping a bottom section of the lower portion of the fuel bundle assembly with a clip and finger springs attached to the lower fuel particle barrier; lowering an upper fuel particle barrier positioned over the upper tie plate and above the fuel rods, wherein the fuel particle barrier has a permeable panel at least co-extensive with an open area of the upper tie plate; passing an arch of the handle through an open slot in the upper fuel particle barrier as the upper fuel particle barrier is lowered; closing the open slot with a closure device after the arch passes through the slot of the upper fuel particle barrier and seats on an upper edge of the channel; blocking fuel particles from flow out of the nuclear reactor fuel bundle assembly by using the upper fuel particle barrier seated on the upper edge of the channel and the lower fuel particle barrier on the lower portion of the fuel bundle assembly.

DETAILED DESCRIPTION OF THE INVENTION

The upper and lower tie plate fuel particle barrier assemblies and the methods for applying these assemblies to the ends of a fuel bundle assembly disclosed herein provide a means for ensuring that fuel particles do not flow out of a fuel bundle assembly while it is in a dry storage containment vessel. Specifically, the upper and lower fuel particle barriers are designed to confine fuel particles under abnormal dry storage conditions while not impeding convective heat transfer under normal dry storage conditions. The fuel particle barrier assemblies confine within the fuel bundle assembly particles that might be released from damaged fuel rods while allowing water to drain out and gas to flow through the fuel bundle assembly. The fuel particle barrier assemblies, in combination with the existing channel, form a confinement system for dry storage of nuclear fuel bundles. The fuel particle barrier assemblies may be substituted for a conventional fuel canister used to store damage fuel bundle assemblies. In addition, the fuel particle barrier assemblies may be used on sound fuel bundles to provide a second confinement barrier in addition to the clad confinement barrier. This will provide additional assurance of confinement. Applying the fuel particle barrier assemblies to sound fuel bundles could be used to avoid fuel characterizations of the sound fuel bundles prior to dry storage.

Figure 1:
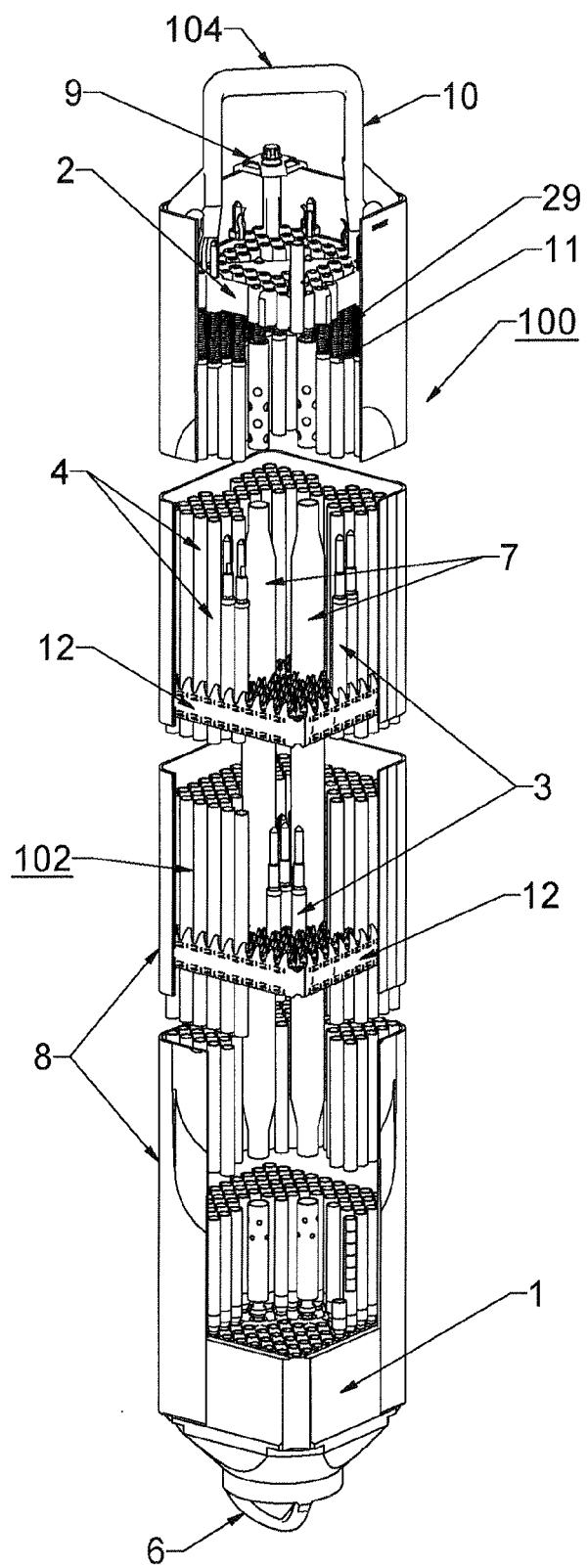
FIG. 1 is a segmented side view of a conventional nuclear fuel bundle assembly with all of the various components that makes up an assembly.

FIG. 1 is a segmented side view of a nuclear fuel bundle assembly 100 including a fuel bundle 102 and showing several portions of a channel 8. The fuel bundle assembly 100 is shown split along two horizontal planes to better show the upper and lower end sections and a representative middle section of the nuclear fuel bundle assembly.

The fuel bundle 102 includes fuel rods 3, 4 and water rods 7 that are parallel to each other and arranged in an array, such as a rectangular array shown in FIG. 1. The fuel bundle also includes a lower tie plate 1 and an upper tie plate 2 to support the fuel rods 3, 4 and water rods 7. Partial length fuel rods 3 are supported at their lower ends by the lower tie plate 1. Full-length fuel rods 4 are supported at their lower ends by the lower tie plate 1 and at their upper ends by the upper tie plate 2. Similarly, the water rods 7 have lower ends that are supported by the lower tie plate 1 and upper rod ends that are supported by the upper tie plate 2. The water rods 7 are typically arranged in the center of the fuel bundle 102 and the fuel rods 3, 4 are arranged around the water rods 7. The fuel rods and water rods are parallel to each other in the fuel bundle assembly 100.

Grid spacers 12 maintain the arrangement of the fuel rods 3,4 and water rods 7, and are positioned at different elevations in the fuel bundle 102. The upper ends of the full length fuel rods 4 and full length water rods 7 are connected to the upper tie plate 2 by the upper end plugs 11 on the fuel rods and water rods. The plugs are fitted with an expansion springs 29. The tie plates 1, 2, and grid spacers 12 are each generally rectangular metallic structures having an open mesh interior.

The open mesh allows coolant and moderator fluid in the BWR core to flow freely through the fuel bundle assembly 100 in a flow direction parallel to the fuel and water rods. The open mesh structure of these support components of the fuel bundle will allow fuel particles to fall out of the bundle. Fuel particles do not fall from sound fuel rods. However, fuel particles may fall from damaged fuel rods where the cladding has at least a 1 mm opening. Fuel particles from damaged fuel rods are a potential concern and risk and are preferably confined within the fuel bundle assembly. Accordingly, a confinement system is needed to prevent fuel particles from falling from a damaged fuel bundle assembly after the assembly has been removed from the BWR core.

The channel 8 is a thin metal housing extending around the perimeter of the fuel bundle assembly 100. FIG. 1 shows only the corners of the channel 8 so that the rods, grid spacers and other internal components of the fuel bundle may be shown in the figure. In practice, the channel has sidewalls that enclose the sides of the fuel bundle and form a generally rectangular housing oriented vertically and extending around all sides of the fuel bundle 102. The combination of the fuel bundle 102 and channel 8 is referred to as a fuel bundle assembly 100. A channel fastener assembly 9 is attached to the top of the fuel bundle to secure the channel to the fuel bundle. The channel fastener assembly 9 may be a metallic clip and rod that secures an upper corner of the channel to the upper tie plate 2.

The lower tie plate tri-bail 6 is a circular housing at the bottom of the fuel bundle assembly that supports the lower tie plate 1, channel 8 and the entire fuel bundle assembly 100. The lower tie plate, tri-bail 6 has a circular frame defining a generally open passage that extends from the lower tie plate 1 to an outlet at the bottom end of the housing. The passage allows coolant and moderator to pass through the bottom of the fuel bundle assembly 100.

An upper tie plate handle 10 is secured to the upper tie plate 2 and abuts the interior corners of the channel 8. The upper tie plate handle 10 includes a generally rectangular arch 104 that extends above the fuel bundle assembly 100. The handle 10 is used to lift and move the fuel bundle into and out of the reactor core and the storage areas.

Figure 2:
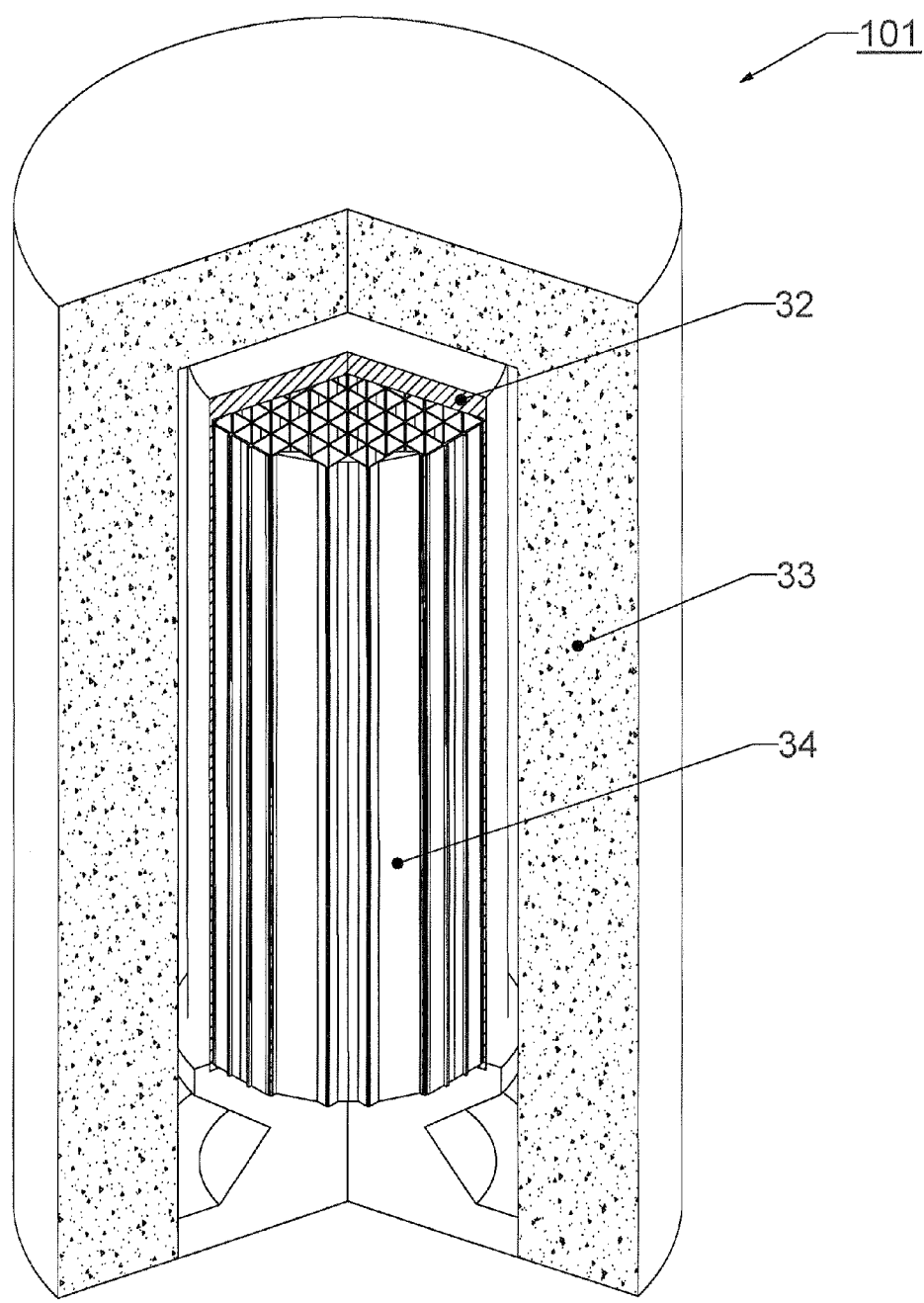
FIG. 2 is a cut-away view of a dry fuel storage system.

FIG. 2 is a cut-away view of a dry fuel storage system 101. The sealed dry storage canister or container 32 contains a basket 34 that holds the fuel bundle assemblies 100. The loaded dry storage canister or container is then placed into a dry storage cask 33 made of cement, steel or a composition of both.

Figure 3:
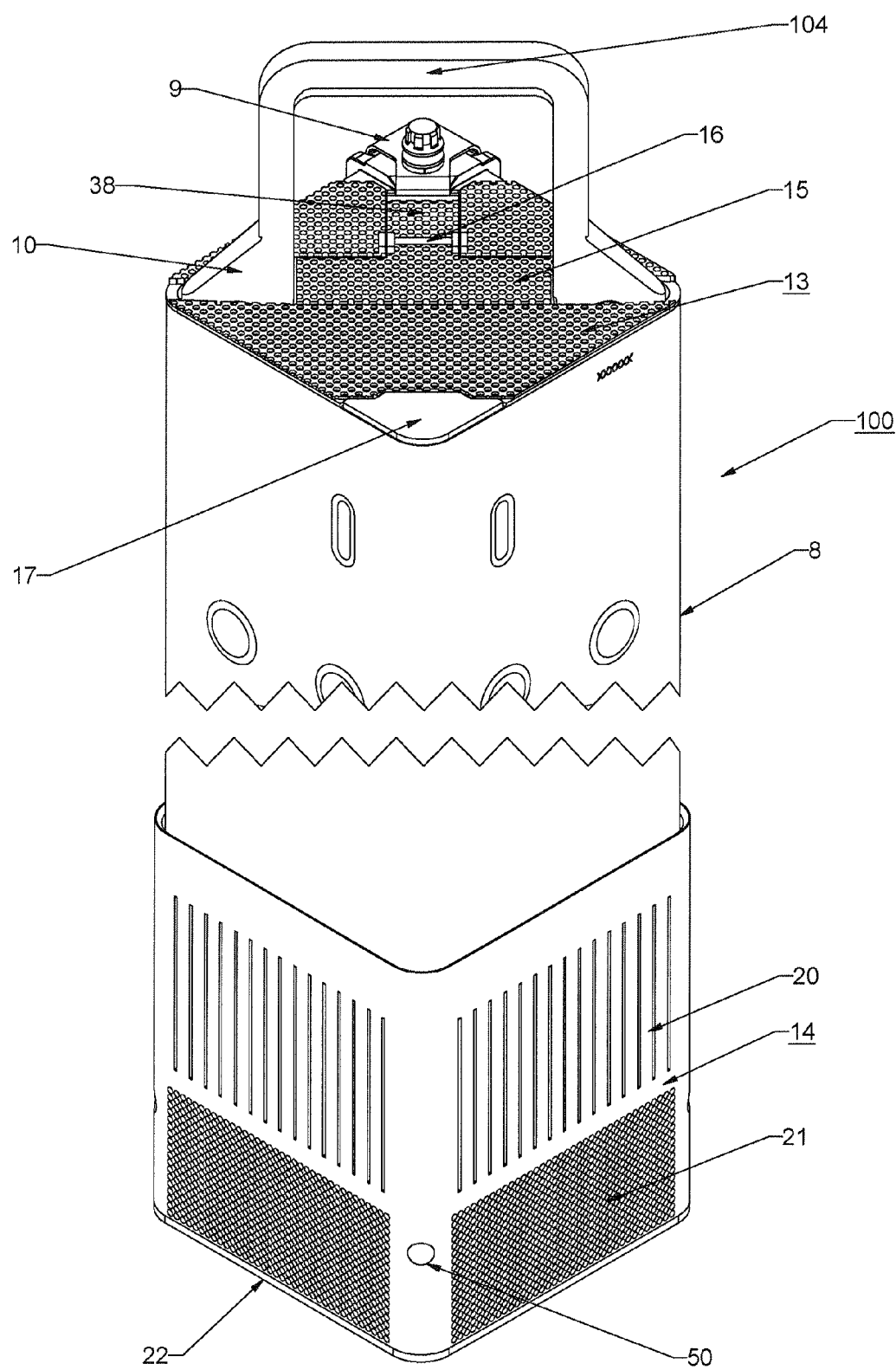
FIG. 3 is an isometric perspective view of a fuel bundle assembly with the upper and lower fuel particle barrier assemblies attached, wherein a middle section of the fuel bundle assembly has been omitted for purposes of illustration.

FIG. 3 is a top and side perspective view of the fuel bundle assembly 100 after removal from the reactor core and assembled for storage. As shown in FIG. 3, the fuel bundle assembly 100 has been fitted with an upper fuel particle barrier assembly 13 and a lower fuel particle barrier assembly 14. These fuel particle barrier assemblies and the channel 8 form a confinement system to prevent fuel particles from falling from the fuel bundle assembly during storage while allowing gas flow and water drainage.

The upper fuel particle barrier assembly 13 covers the open upper end of the channel 8 to prevent fuel particles from flowing out of the top of the fuel bundle assembly 100. The perimeter of the upper tie plate fuel particle barrier assembly 13 extends to the upper edge of the channel 8 and abuts the sides of the upper tie plate handle 10. In addition, one corner of the upper fuel particle barrier assembly 13 abuts the channel fastener assembly 9 and an opposite corner of the fuel particle barrier assembly abuts a channel clip 17 on a corner of the channel 8 with all gaps equal to or less than 1 mm (millimeter).

The lower section of the fuel bundle assembly is seated in the lower fuel particle barrier assembly 14, which includes a generally rectangular frame having an open upper section to receive the fuel bundle assembly 100. The lower fuel particle barrier assembly 14 encloses the lower tie plate tri-bail 6, the lower tie plate 1 and the lower section of the channel 8. A receiver 50, such as recess, indentation, flange, ledge or other support surface, within the structure support of the short columns 23 creates a surface to receive a retaining device for securing the fuel bundle assembly. The receiver 50 allows the lower fuel particle barrier assembly 14 to be firmly secured by a retaining device that maybe attached to a fuel inspection station at a nuclear facility. The receiver 50 may also make use of a special handling tool device(s), to engage with the receiver 50, to aid in the removal and the insertion of the fuel bundle assembly 100 within the lower fuel particle barrier assembly 14, as needed.

Figure 4:
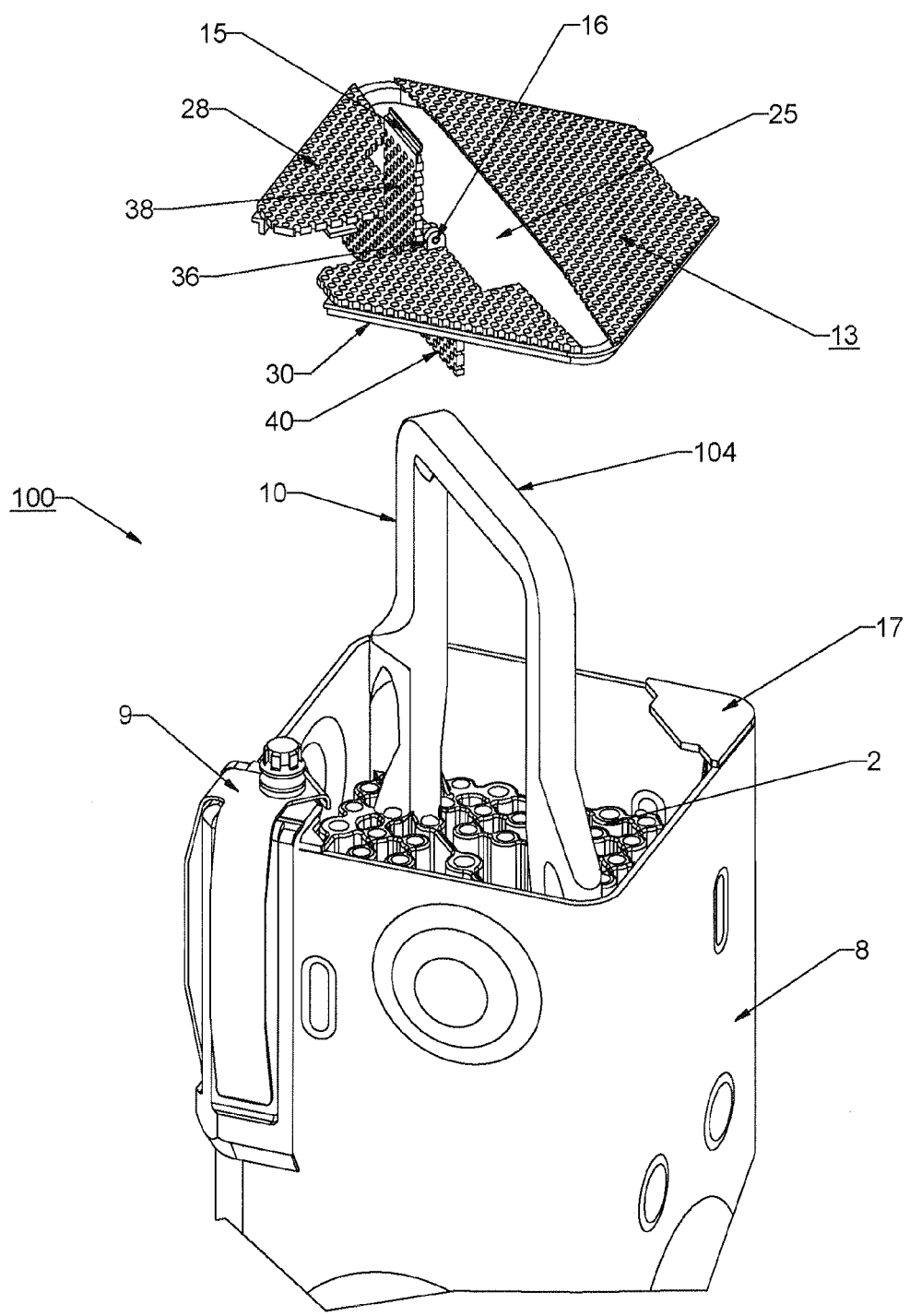
FIG. 4 is an exploded view of an upper section of a fuel bundle assembly with the upper fuel particle barrier assembly with a hinged trap door shown above the bundle.

FIG. 4 is an exploded view of an upper section of a fuel bundle assembly 100 with the upper fuel particle barrier assembly 13 shown above the arch 104 of handle 10. The upper fuel particle barrier assembly 13 includes flat grid or mesh panels 28 that are supported on a frame 30 that may be formed by L-shaped beams. The frame 30 may have a lip and corner that seat on the upper edges or upper surfaces of the channel 8. The flat panels 28 have an open grid structure to allow liquid or gas in the storage canister to pass through the fuel particle barrier assembly 13. The size of the openings in the grid is equal to or less than 1 millimeter, to prevent fuel particles from flowing through the upper fuel particle barrier assembly but similar to the openings in the upper tie plate 2 so that it does not inhibit convective gas flow during storage. Further, a mesh or screen may be applied to a surface of the flat panels 28 to ensure that an even smaller sized particles do not pass through the panels.

A slot 25 allows the fuel particle barrier assembly to move vertically downward on the fuel bundle assembly 100 and pass over the arch 104 of the handle 10. The shape of the slot may conform to the outline of the handle when the handle is viewed from the top downward. The slot 25 may further include an additional open area, such as near the hinge 16 for the trap door 15 device. One end of the trap door 15 may be machined to be flexible when securing the door closed such that by pressing downward on an end of the door latches the end of the door under an edge of the channel fastener assembly 9.

The hinged trap door 15 on the upper tie plate fuel particle barrier assembly 13 swings open to allow the fuel particle barrier assembly to slide over the arch 104 of the upper tie plate handle 10. The trap door swings closed when the fuel particle barrier assembly 13 has slid past the arch 104 of the handle 10 and is seated on the upper edges of the channel 8. When the trap door 15 is closed, the door covers the slot 25 in the fuel particle barrier assembly 13. The trap door 15 may include one or more flat grid or mesh panels that includes a front planer section 40 that has a perimeter that generally corresponds to the slot 25 opening. The hinge 16 for the trap door 15 may include a rod supported by flanges 36 on a panel(s) of the upper fuel particle barrier assembly 13. The trap door includes flanges 36 through which the rod extends and that allow the door 15 to pivot about the rod in the hinge 16. The trap door 15 includes a tab section 38 on one side of the hinge 16. The tab section 38 pivots up when the door is open and can be pushed down to close the trap door 15 until it latches itself under the edge of the channel fastener assembly 9. A forward panel section 40 of the trap door is on an opposite side of the hinge 16 relative to the tab section 38. The forward section and tab section are formed of a metallic grid or mesh material, similar to the panels 28. When the trap door 15 is closed (FIG. 3), the forward panel section 40 and tab section 38 close the openings in the upper fuel particle barrier assembly 13 and form a continuous mesh with the panels 28 that cover the upper end of the fuel bundle assembly 100.

Figure 5:
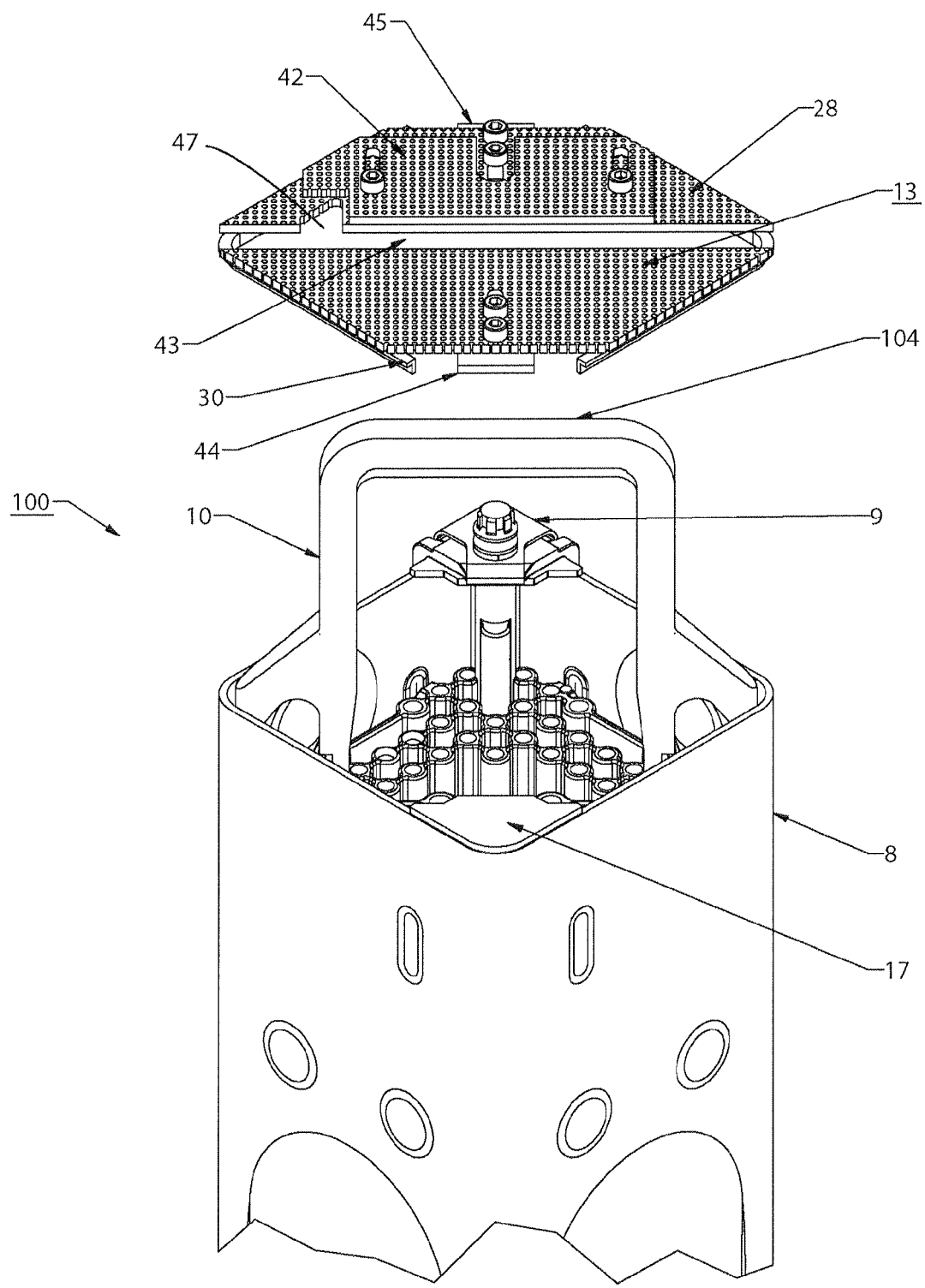
FIG. 5 is an exploded view of an upper section of a fuel bundle assembly with the upper fuel particle barrier assembly with a sliding trap door shown above the bundle.

Alternatively, FIG. 5 shows that the trap door of the upper fuel particle barrier assembly 13 may open and close with a sliding mechanism rather than a hinge. Such a sliding mechanism would allow the trap door 42 to slide away from the slot 43 to allow the handle 10 to pass through the slot. After the fuel particle barrier assembly is seated on the channel 8 upper edges, the trap door slides to close the slot. In this version of the upper fuel particle barrier assembly 13, the assembly is attached to the channel 8 by sliding tabs 44 and 45 under the channel clip 17 and channel fastener assembly 9, respectively.

Figure 6:
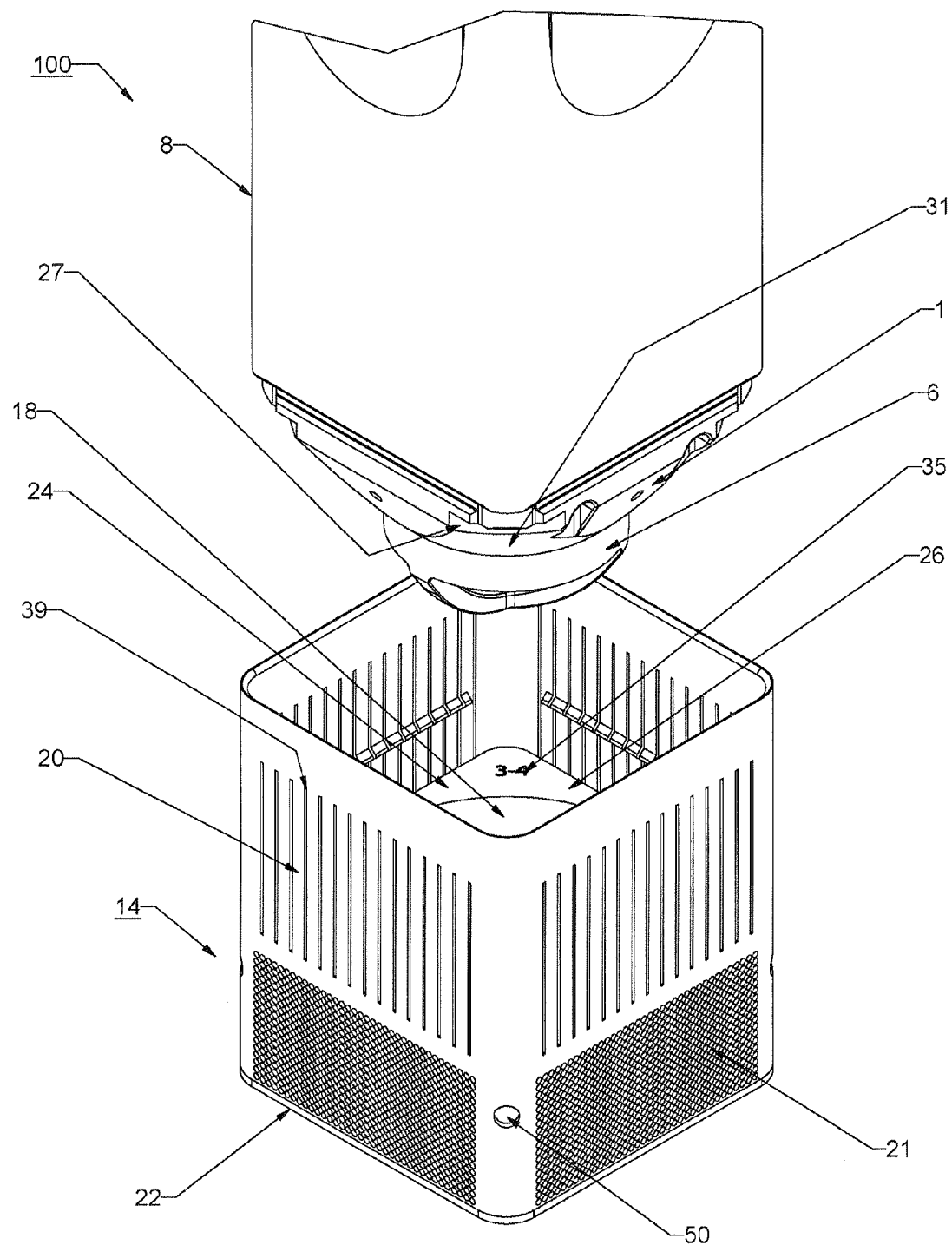
FIG. 6 is an exploded view of a lower section of a fuel bundle assembly with the lower fuel particle barrier assembly shown below the fuel bundle assembly.

FIG. 6 shows the bottom of a fuel bundle assembly 100 being lowered into the lower fuel particle barrier assembly 14. The surfaces 27 and 31 on lower tie plate 2 are to be seated, respectively, to surfaces 26 and 18 of the lower fuel particle barrier assembly 14. The rectangular frame 24 includes the surfaces 18 and 26.

Figure 7:
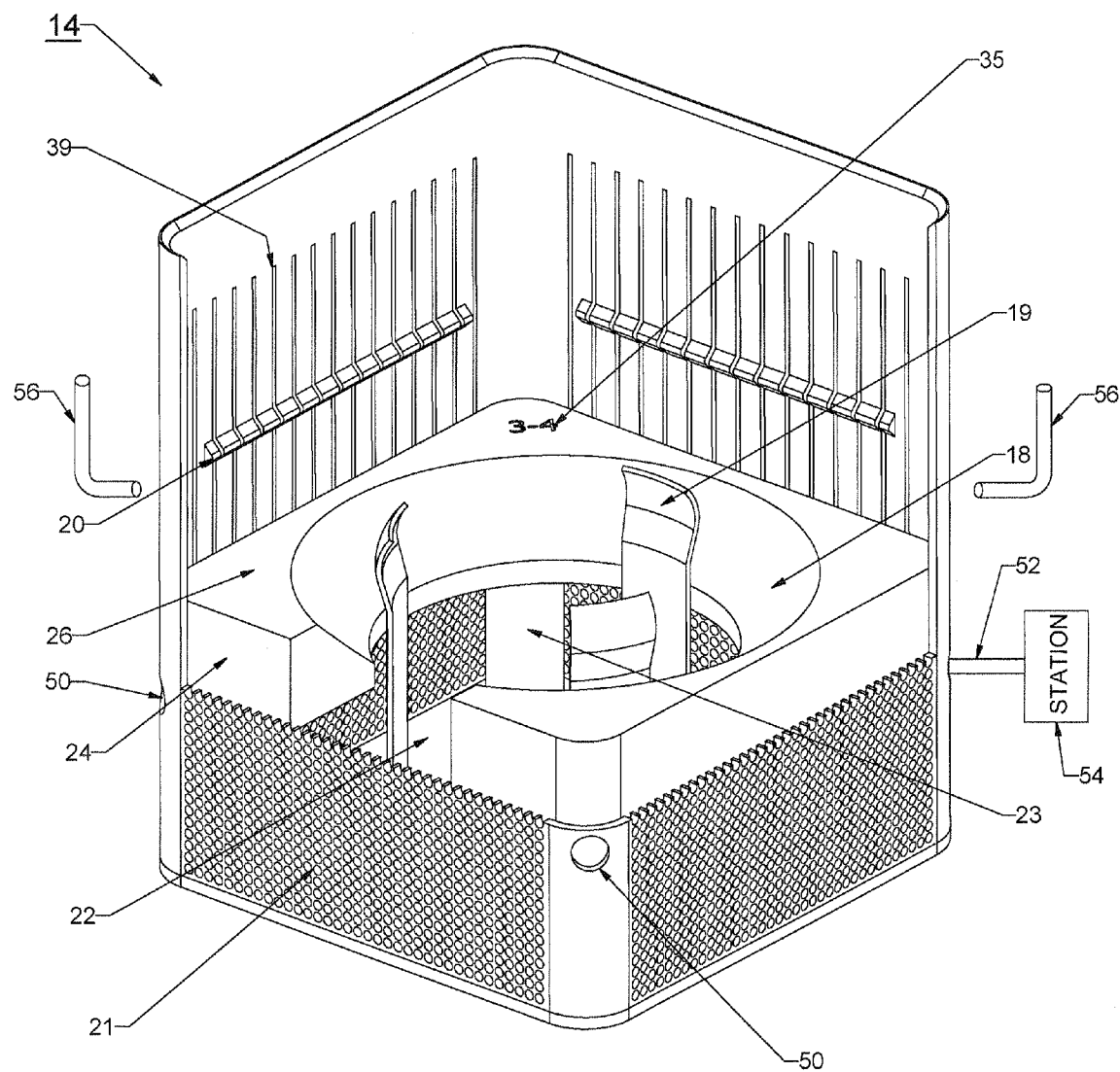
FIG. 7 shows an exploded view of the lower fuel particle barrier assembly with sidewalls removed to expose interior components of the assembly. The permeable panels are shown with small perforated holes that will confine the fuel particles and allow passage of gas.

FIGS. 3, 6 and 7 show a receiver 50 within the structure support of the short columns 23, that allows the lower fuel particle barrier assembly 14 to be firmly secured by a retaining device, that maybe attached to a connector 52 of a fuel inspection station 54. By forming the receivers 50 to be integral with each of the four short columns 23, the receivers provide a sturdy and strong connection location to provide structural support to the lower fuel particle barrier assembly and the associated fuel bundle once the lower fuel particle barrier assembly 14 is securely fasten within a fuel inspection station. The receiver 50 may engage handling device, such as a lift mechanism 56 that couples to each receiver 50 at the four corners of the lower fuel particle barrier assembly. The connection between the four receivers 50 and the lift mechanism 56 allows for the removal and the insertion of the fuel bundle assembly 100 within the lower fuel particle barrier assembly 14.

FIG. 7 shows the lower fuel particle barrier assembly 14 with the sidewalls removed to expose the interior components of the assembly. The lower fuel particle barrier assembly includes short columns 23 attached to the bottom base plate 22 that support the rectangular frame 24 and add side structure support. The sidewalls of the fuel particle barrier assembly 14 are secured to the frame 24 and bottom base plate 22, such as by welding.

The lower portion of the tri-bail extends through an opening formed by the beveled ring in the frame 24. The clips 19 insert through the tri-bail into the hollow part of the lower tie plate to secure the lower fuel particle barrier to the lower tie plate. The clips 19 are located such that only one orientation of the fuel bundle assembly will insert into the lower fuel particle barrier. To ensure the proper orientation, an orientation mark 35, e.g., a channel locator indicated by the indicia "3-4", is stamped into only one of the four corners, of the rectangular frame 24. The orientation mark provides a visual cue to aid in the proper alignment of the fuel bundle assembly with the frame 24 of the lower fuel particle barrier assembly 14. The clips 19 may be metallic and are attached, e.g., welded, to the bottom base plate 22.

The sidewalls and the flat bottom of the lower fuel particle barrier assembly 14 may be formed of metal panels that are generally solid. At least one of the sidewalls or bottom base plate, includes a panel with an open mesh, screen or grid section 21 through which fluid may flow into or from the fuel bundle but not allow fuel particles or other solids to pass through. The gas flow area of section 21 is similar to the lower tie plate without assembly 14 so that heat transfer via convection during dry storage is not inhibited by the fuel particle barrier assembly 14. The interior side-walls of the lower tie plate fuel particle barrier assembly 14 include finger springs 20 arranged vertically.

Figure 8:
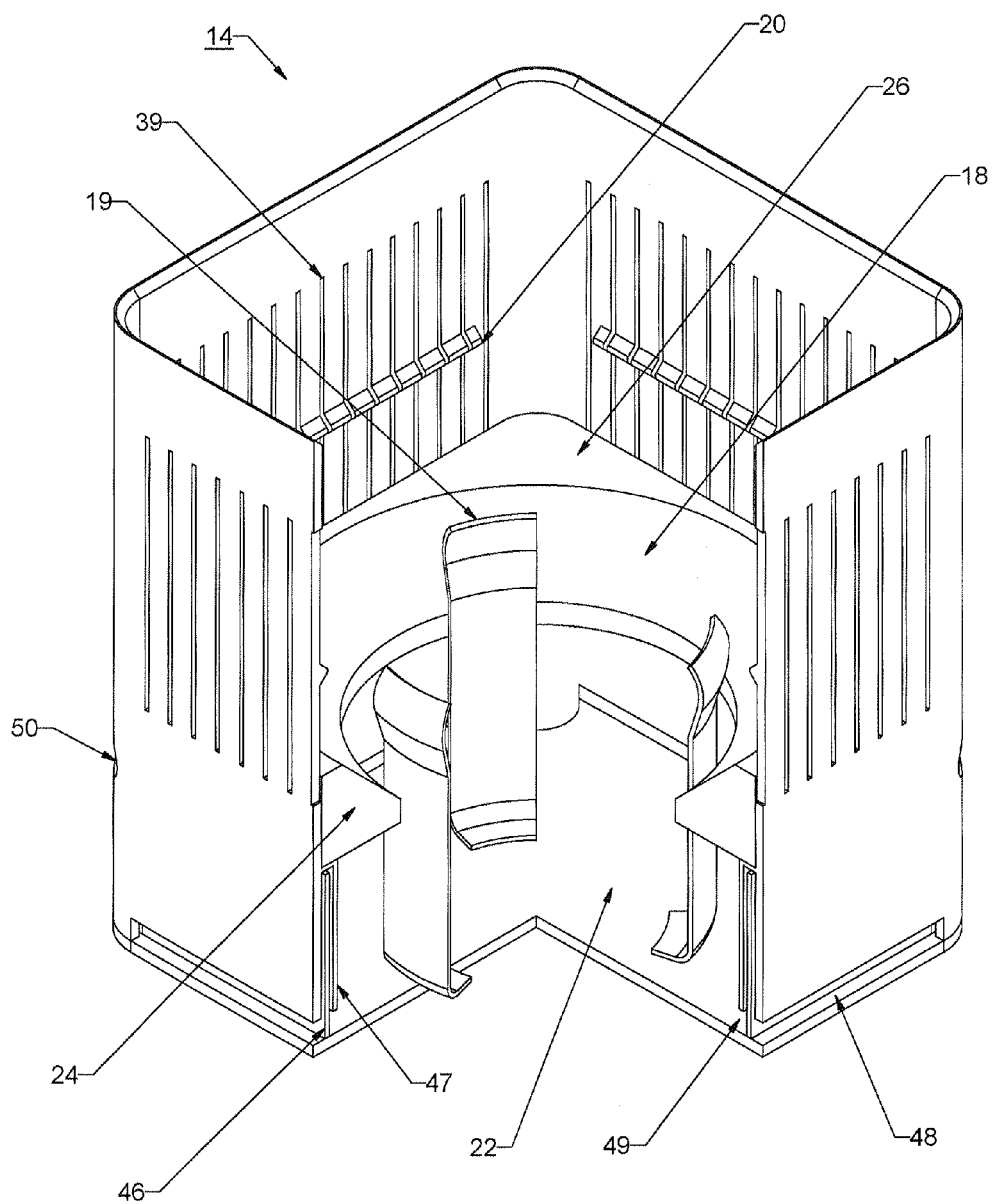
FIG. 8 shows an exploded view of the lower fuel particle barrier assembly with sidewalls removed to expose interior components of the assembly. The permeable panels shown utilize a tortuous path to confine fuel particles while enabling gas flow through the bundle.

FIG. 8 shows the lower fuel particle barrier assembly 14 with the sidewalls removed to expose the interior components of the assembly. In this figure the open mesh, screen or grid sections 21 are replaced with tortuous path structures that form a permeable panel to allow gas flow through the assembly 14. The tortuous path is produced by attaching plate 46 to the bottom base plate 22 and plate 47 to the frame 24 such that a continuous and tortured path is defined from the outside slot 48 to the inside slot 49. This tortuous path provides a path for fluids but confines fuel particles that are equal to or greater than 1 millimeter that, due to gravity, cannot traverse the tortuous path from slot 49 to slot 48.

Similar to the screen or grid in section 21, the flow area of the tortuous path would be similar to the flow area of the lower tie plate without assembly 14 so that convective heat transfer is not diminished. For example, the resistance to gas flow by the tortuous path may vary depending on the number, size and spacing between the permeable plates 46 and 47, that are attached to the bottom base plate 22 and the rectangular frame 24. The number of plates 46, 47 may vary depending on the designed opening in the lower tie plate 1, such that the number of plates is selected to ensure that the gas flows through the lower fuel particle barrier without impeding the intended rate of convective heat transfer of the gas flow through the fuel bundle during normal dry storage conditions, but does limit particle size material from escaping between the plates.

Figure 9:
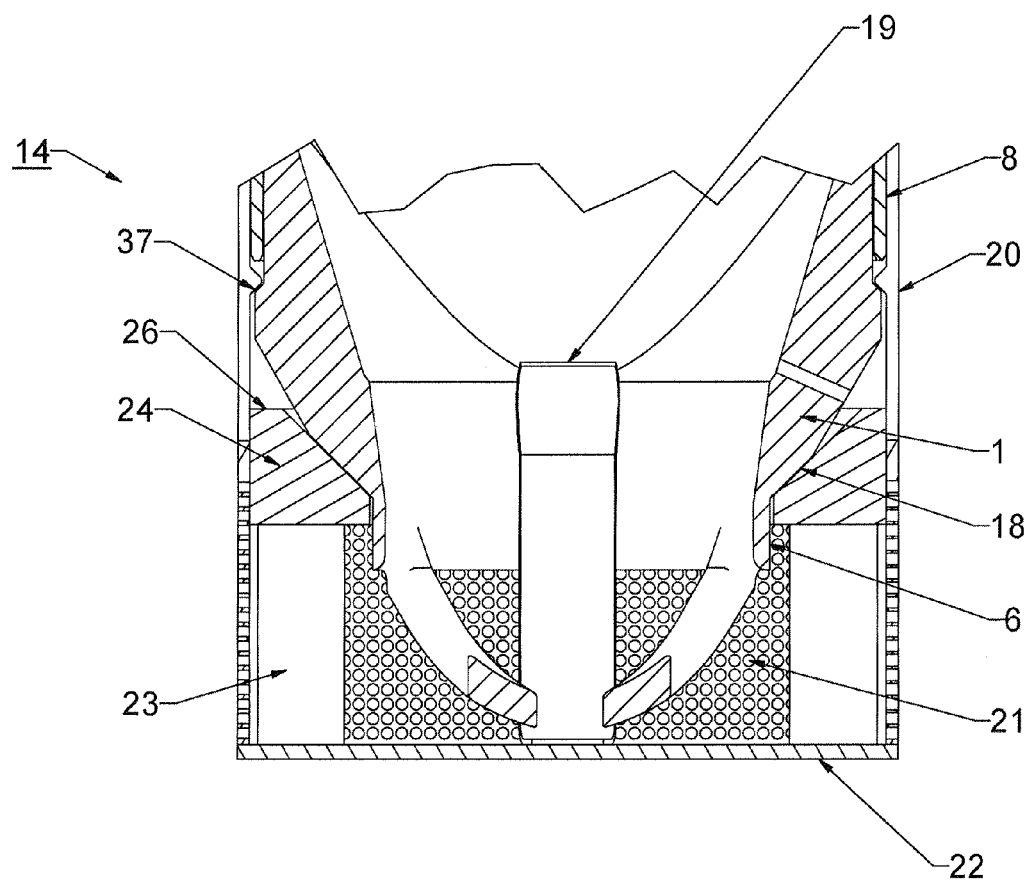
FIG. 9 is a section view of the lower fuel particle barrier assembly showing the lower fuel particle barrier assembly secured to the lower tie plate.

FIG. 9 is a section view of the lower fuel particle barrier attached to the lower tie plate. When the bottom of the fuel bundle assembly is seated in the lower fuel particle barrier assembly 14, the finger springs 20 each have a protrusion that snaps into and locks onto a ledge 37 on the lower tie plate 1, as the lower tie plate descends into the lower fuel particle barrier assembly 14. The view shown in FIG. 9 illustrates how the clips 19 are secured to the inside of the lower tie plate surfaces. The lower fuel particle barrier assembly 14 is attached to the lower tie plate 1 by both the finger springs 20 and the clips 19. The gaps 39 (see FIG. 8) between the finger springs are also small enough to assist in blocking fuel particles from passing between the channel and the sidewalls of the fuel particle barrier assembly 14.

The upper and lower fuel particle barrier assemblies 13, 14 are placed on the ends of a fuel bundle assembly that has been removed from the core of the BWR. The fuel particle barrier assemblies may be placed on all removed fuel bundle assemblies being processed for dry storage. Alternatively, the fuel particle barrier assemblies may be applied to only damaged fuel bundle assemblies. The upper and lower fuel particle barrier assemblies 13, 14 form a fuel bundle confinement system that includes the existing channel on the fuel bundle assembly. By incorporating the channel in the confinement system, the channel 8 is reused and is not discarded separately.

In one exemplary operation, a fuel bundle assembly 100 is removed from the reactor core of a BWR and is inspected to determine if it has damaged fuel rods. If damaged, the fuel bundle assembly is positioned over a lower fuel particle barrier assembly 14. As the bottom of the fuel bundle assembly is lowered into the lower fuel particle barrier assembly 14, the clips 19 latch to the inside of tri-bail 6 as the tri-bail is inserted into the opening defined by the beveled ring of frame 24. The bottom of the lower tie plate 1 rests on the upper platform surface 26 of the frame 24. The finger springs 20 of the lower fuel particle barrier assembly slide over the lower tie plate 1 and latch onto ledge 37. Attaching the lower tie plate fuel particle barrier assembly 14 preferably does not require disassembly or modification of the fuel bundle assembly.

The upper fuel particle barrier assembly 13 is preferably attached without disassembly or modification of the fuel bundle assembly. As the upper fuel particle barrier assembly is lowered on the top of the fuel bundle assembly, the trap door 15 is pivoted to an open position (see FIG. 3) by, for example, pulling up the tab 15 on the door. The open trap door 15 allows the fuel particle barrier assembly to be lowered down past the arch of the handle 10 of the fuel bundle assembly. After the upper fuel particle barrier assembly 13 is seated on the upper edge of the channel 8, the trap door 15 is closed. With the door closed, the upper fuel particle barrier assembly 13 forms an open mesh or grid extending over the entire open area of the top of the fuel bundle assembly.

The confinement system disclosed herein is formed by an existing channel and upper and lower fuel particle barrier assemblies 13, 14. This confinement system has several advantages over conventional systems including:

(1) The channel 8, in combination with the upper and lower fuel particle barrier assemblies 13, 14, forms a damaged fuel canister for failed fuel rods. Utilizing the channel 8 reduces the need for additional components of the confinement system and reuses the channel. This advantage is particularly useful with fuel bundle assemblies taken from BWRs which have channels. Incorporating the channel in the confinement system avoids costs and other difficulties associated with disposing of a channel and separately storing a fuel bundle.

(2) Positioning a fuel bundle assembly into a lower tie plate fuel particle barrier assembly 13 is a simple process of vertically aligning and lowering the bottom of the fuel bundle assembly into the lower fuel particle barrier assembly. The time and effort needed to attach the lower fuel particle barrier assembly to the fuel bundle assembly is minimal and modifications are not needed to the fuel bundle assembly.

(3) Aligning and Positioning the upper fuel particle barrier assembly 14 on the fuel bundle assembly is a simple process of vertically lowering the fuel particle barrier assembly on the upper section of the fuel bundle assembly and opening the trap door to allow the barrier assembly to be lowered over the arch in the handle of the fuel bundle assembly. A notch 47 (FIG. 5) at one end of the slot 43 provides ordination between the closure device and the handle.

(4) The confinement system has a screen, mesh or grid on the panels of the upper and lower fuel particle barrier assemblies to allow water and gas to flow through the fuel bundle and confine fuel particles or other debris released from damaged fuel rods.

(5) The confinement system also has a potential application on sound bundles where it would act as a second line-of-defense to the primary clad confinement barrier. This additional confinement barrier in sound bundles will provide additional assurance of confinement and could be used to eliminate the need for fuel characterization prior to dry storage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nuclear reactor fuel bundle confinement system comprising:
    a fuel bundle including an array of fuel rods and an upper tie plate;
    a channel enclosing the fuel bundle and having an open upper end;
    a handle for the fuel bundle extending above the fuel bundle;
    an upper fuel particle barrier positioned over the upper tie plate and above the fuel rods, wherein the fuel particle barrier has a panel at least co-extensive with an open area of the upper tie plate;
    a slot in the panel through which passes the handle, and
    a closure device on the fuel particle barrier having a closed position in which the closure device covers the slot and an open position that leaves the slot open to allow the handle to pass through the slot.

2. The nuclear reactor fuel bundle confinement system as in claim 1 wherein the closure device is a permeable door having a shape generally conforming to a portion of the slot not blocked by the handle when the upper fuel particle barrier is seated on an upper edge of the channel.

3. The nuclear reactor fuel bundle confinement system as in claim 2 wherein the door is hinged to the upper fuel particle barrier.

4. The nuclear reactor fuel bundle confinement system as in claim 2 wherein the door slides in and out to cover and open the slot for the handle.

5. The nuclear reactor fuel bundle confinement system as in claim 2 wherein the door has a generally T-shape.

6. The nuclear reactor fuel bundle as in claim 1 further comprising a notch in one end of the slot, wherein the notch provides orientation between the closure device and the handle.

7. The nuclear reactor fuel bundle confinement system as in claim 1 wherein the upper fuel particle barrier forms a planar permeable panel assembly covering the upper tie plate, when the closure device is in the closed position, and the flow area is such that convective heat transfer is not impeded under normal dry storage conditions.

8. A nuclear reactor fuel bundle confinement system comprising:
    a fuel bundle including an array of fuel rods, a lower tie plate and a lower tie plate tri-bail attached to and below the lower tie plate;
    a channel enclosing the fuel bundle and having an open lower end;
    a lower fuel particle barrier assembly including sidewalls extending around the outer walls of the channel, finger springs that attach to the lower tie plate, a bottom panel and an open upper end to receive a lower portion of the fuel bundle, wherein at least one of the sidewalls includes a permeable panel;
    the lower fuel particle barrier assembly further including a frame within and supporting the sidewalls and bottom panel, and the frame includes a ring defining an opening to receive a bottom of the tri-bail, and
    at least one clip attached to the frame, wherein the clip grasps an internal portion of the fuel bundle.

9. A nuclear reactor fuel bundle confinement system as in claim 8 further comprising an indicia on a visible surface of the lower fuel particle barrier assembly, wherein the indicia assists in aligning the fuel bundle assembly with respect to the lower fuel particle barrier assembly.

10. The nuclear reactor fuel bundle confinement system as in claim 8 wherein the at least one clip grasps the tri-bail.

11. The nuclear reactor fuel bundle confinement system as in claim 8 wherein the ring is a beveled ring and serves as a seat for the tri-bail.

12. The nuclear reactor fuel bundle confinement system as in claim 8 wherein the at least one clip is a plurality of clips and the clips are arranged around the lower portion of the fuel bundle.

13. The nuclear reactor fuel bundle confinement system as in claim 8 wherein the sidewalls of the lower fuel particle barrier include finger springs grasping the lower tie plate.

14. The nuclear reactor fuel bundle confinement system as in claim 8 wherein the permeable panel is at least one of a mesh, a screen, a grid and a tortuous path.

15. The nuclear reactor fuel bundle confinement system as in claim 14 wherein a flow area through the permeable panel allows unimpeded convective heat transfer of the fuel bundle under normal dry storage conditions of the fuel bundle.

16. The nuclear reactor fuel bundle confinement system as in claim 14 wherein the permeable panel includes a tortuous path formed by attached plates.

17. A nuclear reactor fuel bundle confinement system comprising:
    a fuel bundle including an array of fuel rods, an upper tie plate, a lower tie plate and a lower tie plate tri-bail attached to and below the lower tie plate;
    a channel enclosing the fuel bundle and having an open lower end;
    a handle for the fuel bundle extending above the fuel bundle;
    an upper fuel particle barrier positioned over the upper tie plate and above the fuel rods, wherein the upper fuel particle barrier has a permeable panel at least co-extensive with an open area of the upper tie plate;
    a slot in the permeable panel through which passes the handle;
    a closure device on the fuel particle barrier having a closed position in which the closure device covers the slot and an open position that leaves the slot open to allow the handle passes through the slot;
    a lower fuel particle barrier including sidewalls extending around the outer walls of the channel, finger springs that attach to the lower tie plate, a bottom panel and an open upper end to receive a lower portion of the fuel bundle, wherein at least one of the sidewalls includes a permeable panel;
    the lower fuel particle barrier further including a frame within and supporting the sidewalls and bottom panel, and the frame includes a ring defining an opening to receive a bottom of the tri-bail, and
    at least one clip attached to the frame, wherein the clip grasps the lower portion of the fuel bundle.

18. The nuclear reactor fuel bundle confinement system as in claim 17 further comprising a notch in the slot to orient the closure device with respect to the handle.

19. The nuclear reactor fuel bundle confinement system as in claim 17 further comprising a visible indicia on the lower fuel mark to assist in orienting the lower fuel particle barrier assembly with respect to the fuel bundle assembly.

20. The nuclear reactor fuel bundle confinement system as in claim 17 wherein the closure device comprises a permeable door having a shape generally conforming to a portion of the slot not blocked by the handle when closure device is seated on an upper edge of the channel.

21. The nuclear reactor fuel bundle confinement system as in claim 17 wherein the upper fuel particle barrier is generally planar when the closure device is in the closed position.

22. The nuclear reactor fuel bundle confinement system as in claim 17 wherein the at least one clip grasps the tri-bail.

23. The nuclear reactor fuel bundle confinement system as in claim 17 wherein the ring is a beveled ring and serves as a seat for the tri-bail.

24. The nuclear reactor fuel bundle confinement system as in claim 17 wherein the sidewalls of the lower fuel particle barrier include fingers grasping the lower tie plate.

25. The nuclear reactor fuel bundle confinement system as in claim 17 wherein the upper and lower fuel particle barriers does not impede convective gas flow through the dry fuel bundle.

26. A nuclear reactor fuel bundle confinement system comprising:
    a fuel bundle including an array of fuel rods and an upper tie plate;
    a channel enclosing the fuel bundle and having an open upper end;
    a handle for the fuel bundle extending above the fuel bundle;
    an upper fuel particle barrier positioned over the upper tie plate and above the fuel rods, wherein the fuel particle barrier has a panel at least co-extensive with an open area of the upper tie plate;
    a slot in the panel through which passes the handle;
    a closure device on the fuel particle barrier having a closed position in which the closure device covers the slot and an open position that leaves the slot open to allow the handle to pass through the slot, and
    a lower fuel particle barrier assembly including a supporting column and a receiver integral with the supporting column, wherein the receiver is connectable to nuclear fuel inspection station and is connectable to a fuel bundle lifting mechanism.

27. The nuclear reactor fuel bundle confinement system as in claim 26 further comprising a notch in the slot to orient the closure device with respect to the handle.

* * * * *